UNITED STATES PATENT OFFICE.

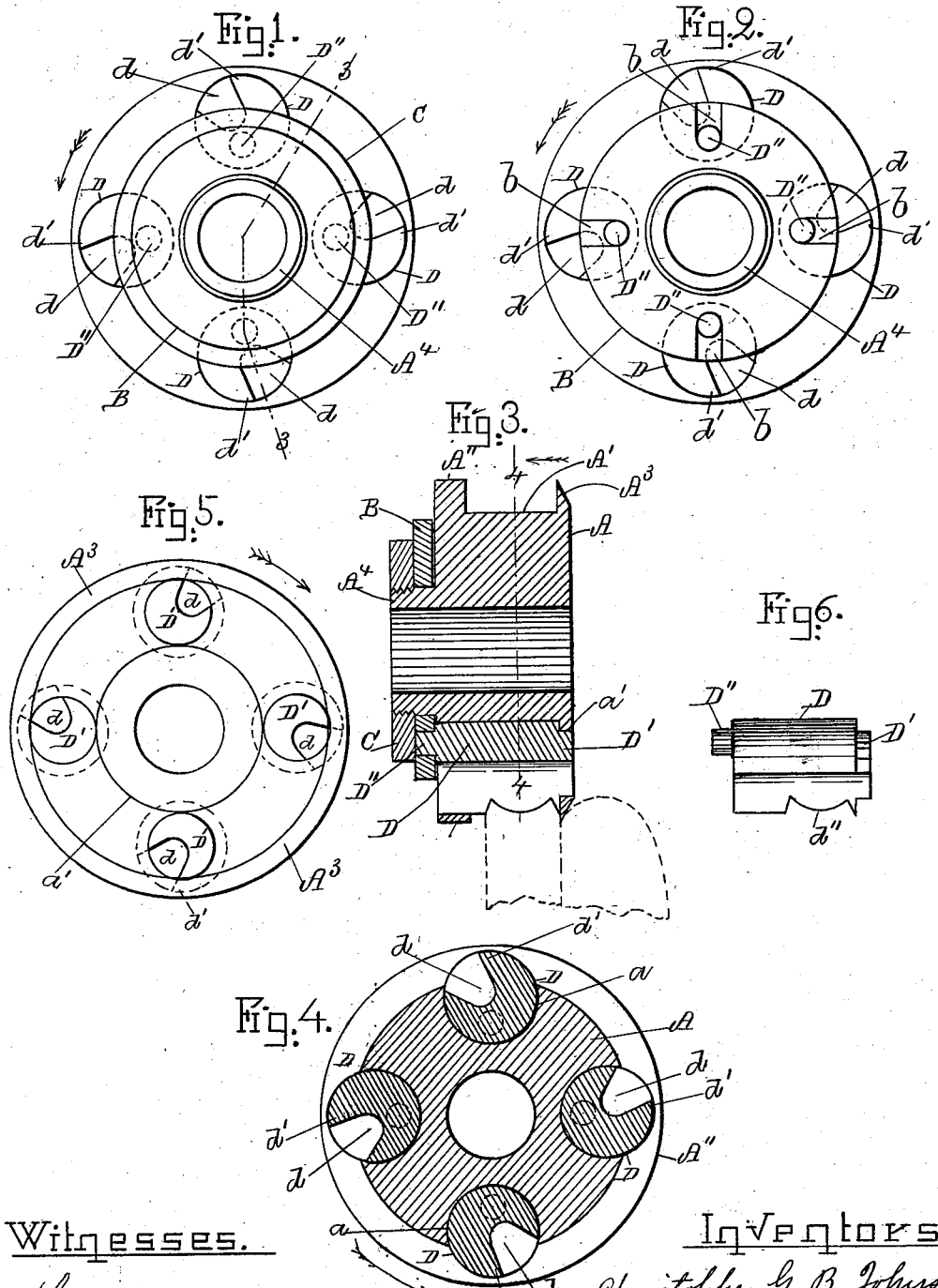

CHRISTOPHER G. B. JOHNSON, OF CHELSEA, AND CHARLES E. KENISTON, OF SOMERVILLE, MASSACHUSETTS.

ROTARY CUTTER.

SPECIFICATION forming part of Letters Patent No. 550,978, dated December 10, 1895.

Application filed May 10, 1895. Serial No. 548,842. (No model.)

*To all whom it may concern:*

Be it known that we, CHRISTOPHER G. B. JOHNSON, a resident of Chelsea, in the county of Suffolk, and CHARLES E. KENISTON, a resident of Somerville, in the county of Middlesex, State of Massachusetts, citizens of the United States, have invented new and useful Improvements in Rotary Cutters, of which the following, taken in connection with the accompanying drawings, is a specification.

This invention relates to improvements in rotary cutters especially designed for the purpose of trimming edges of boot and shoe soles, leather work, &c., although it may be equally useful for the shaping or cutting of other materials, as may be desired.

The invention is carried out as follows, reference being had to the accompanying drawings, wherein—

Figure 1 represents an end elevation of the improved rotary cutter. Fig. 2 represents a similar view showing the fastening-nut as removed. Fig. 3 represents a cross-section on the broken line 3 3 shown in Fig. 1. Fig. 4 represents a cross-section on the line 4 4 shown in Fig. 3. Fig. 5 represents a rear view of the improved cutter, and Fig. 6 represents a detail side elevation of one of the adjustable cutter-blocks.

Similar letters refer to similar parts wherever they occur on the different parts of the drawings.

In the drawings, A represents the cylindrical cutter-holder, adapted to be secured to a rotary shaft in any suitable or well-known manner. Said cutter-holder has on its periphery an annular groove A', an annular lip A'', and an annular tapering upper guide A³, as shown in the drawings. The holder A has made in one piece with its forward end an annular sleeve A⁴, on which is loosely journaled a ring B, provided with radial slots $b$ $b$, as shown in Fig. 2. The outer end of the annular sleeve A⁴ is screw-threaded and on it is screwed the adjustable clamping-nut C, as shown in Figs. 1 and 3.

Through the holder A are made cylindrical recesses $a$ $a$, adapted to receive the oscillating cutter-blocks D D, provided with concentric trunnions D' in their rear ends, journaled in corresponding recesses $a'$ $a'$ in the annular upper guide A³, as shown.

The front ends of the cutter-blocks D are each provided with an eccentric trunnion D'', adapted to be received in the radial notches $b$ of the adjustable ring B, as shown. Each of the cutter-blocks D is provided with a longitudinal groove $d$, one edge $d'$ of which constitutes the cutting-edge during the rotation of the tool in the direction of the arrows shown in the drawings. The configuration of the cutting-edge $d'$ may be made of any suitable shape, according to the form of the edge to be cut on the edge of the leather or other material.

If it is desired to adjust the position of the cutter-blocks D in their bearing-recesses in the holder A, all that is necessary to do is to loosen the nut C and to turn the slotted ring B around its axis, causing said slots to turn the eccentric trunnions D'' to the right or left, as may be desired, by means of which the cutter-blocks D are caused to be oscillated. After the cutter-blocks have been thus adjusted they are secured in place by tightening the nut C, which holds them firmly in position. By this simple arrangement the rake of the cutting-edge of the cutter-blocks may be adjusted to suit the nature of the work and the wishes of the operator. More or less clearance of the cutters may also be obtained by such adjustment, and as the cutting-edges are ground off they may be set up to the required height from time to time.

Having thus fully described the nature, construction, and operation of our invention, we wish to secure by Letters Patent and claim—

The herein described rotary cutter, consisting of an annular grooved holder having longitudinal recesses combined with longitudinal grooved cutter blocks journaled in said recesses, each such cutter-block having an eccentric trunnion received in a notched adjustable ring and means for securing said ring and cutter blocks in their adjusted positions to the holder, substantially as and for the purpose set forth.

In testimony whereof we have signed our names to this specification, in the presence of two subscribing witnesses, on this 26th day of April, A. D. 18

CHRISTOPHER G. B. JOHNSON.
CHARLES E. KENISTON.

Witnesses:
ALBAN ANDRÉN,
LAURITZ N. MÖLLER.